S. HAMPTON.
AUTOMATIC TRAP.
APPLICATION FILED APR. 22, 1921.
1,432,550.
Patented Oct. 17, 1922.
2 SHEETS—SHEET 1.
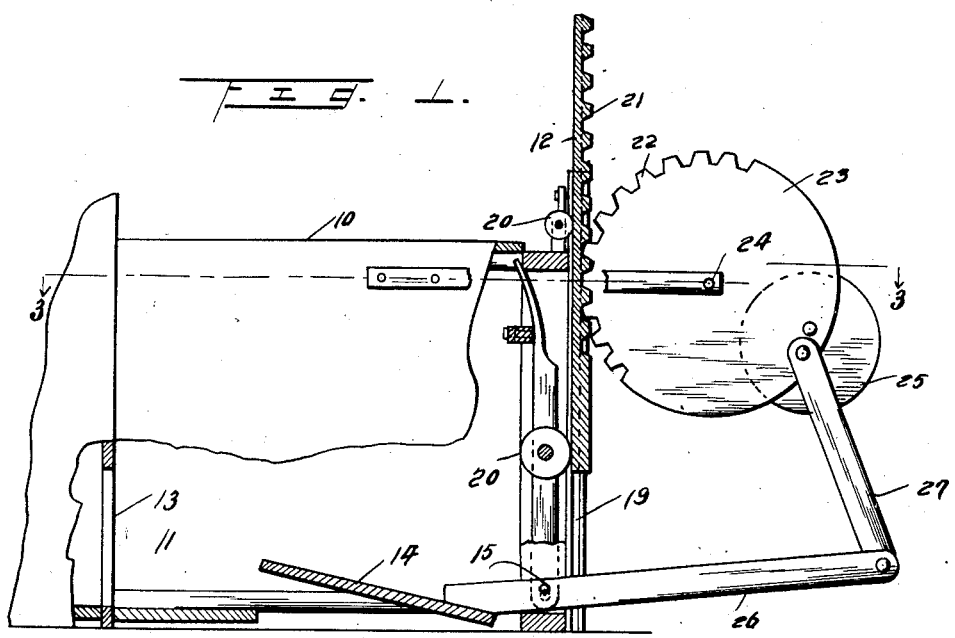
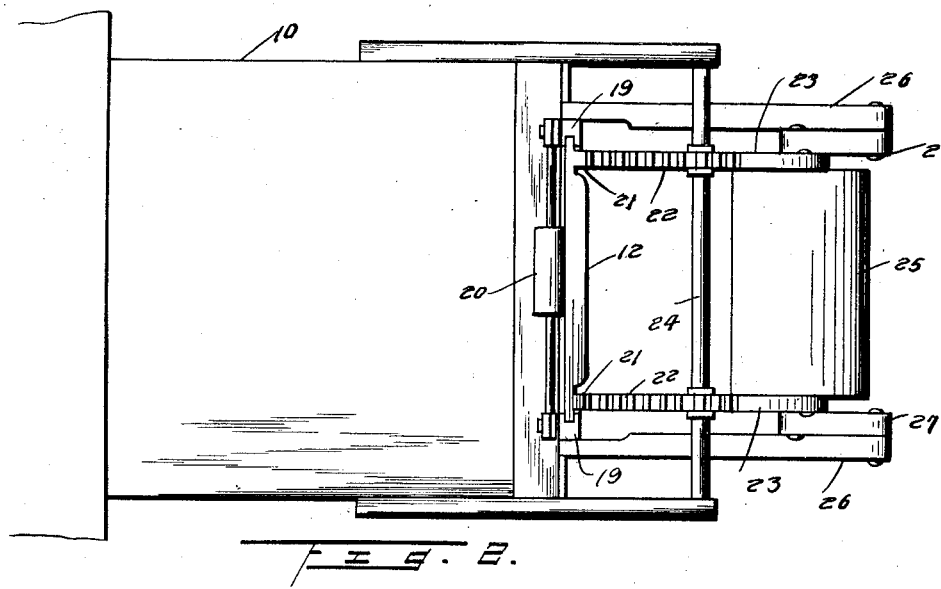
Inventor
S. Hampton.

S. HAMPTON.
AUTOMATIC TRAP.
APPLICATION FILED APR. 22, 1921.
1,432,550.
Patented Oct. 17, 1922.
2 SHEETS—SHEET 2.
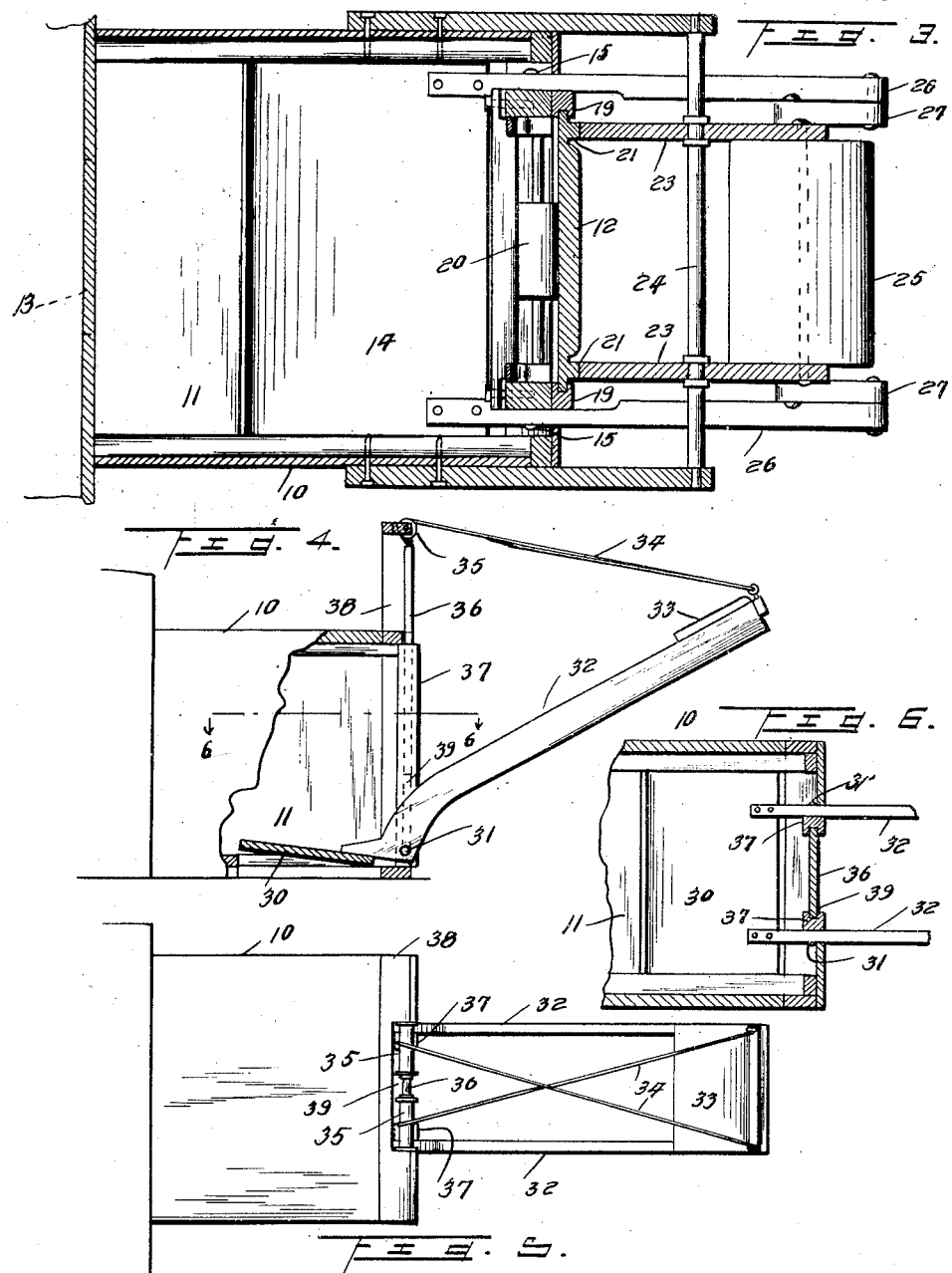
Inventor
S. Hampton.

Patented Oct. 17, 1922.

1,432,550

UNITED STATES PATENT OFFICE.

SIMIE HAMPTON, OF THREELINKS, KENTUCKY.

AUTOMATIC TRAP.

Application filed April 22, 1921. Serial No. 463,530.

*To all whom it may concern:*

Be it known that I, SIMIE HAMPTON, a citizen of the United States, residing at Threelinks, in the county of Rockcastle and State of Kentucky, have invented certain new and useful Improvements in an Automatic Trap; and I do hereby declare the following to be a full, clear, and exact description of the invention, such as will enable others skilled in the art to which it appertains to make and use the same.

The object of the invention is to provide a relatively inexpensive and efficient trap suitable for capturing animals and fowls under conditions designed to avoid the injury thereof while effectually providing against their escape; and more particularly to provide an improved entrance door for traps which has means for inducing such movement of the animal after entering the trap and in an effort to escape therefrom into an inner compartment as to vacate the entrance corridor or compartment, and in that connection to provide for resetting the trap by reopening the entrance door so that a plurality of animals or fowls may be caught successively, and with this object in view the invention consists in a construction and combination of parts of which a preferred embodiment is shown in the drawing, wherein:

Figure 1 is a side view partly in section of a trap having an entrance door and passage controlled thereby embodying the invention.

Figure 2 is a plan view of the same.

Figure 3 is a transverse vertical section on the plane indicated by the line 3—3 of Figure 1.

Figure 4 is a side view partly in section of a trap having a modified form of door structure.

Figure 5 is a plan view of the same.

Figure 6 is a vertical section on the plane 6—6 of Figure 4.

In the illustrated embodiment of the invention the body of the trap which is indicated at 10 may be of any preferred construction having an entrance passage or corridor 11 controlled at one end by an automatic door 12 which embodies the present invention and having an outlet 13 at the other end leading to any suitable permanently retaining compartment the construction of which forms no part of the invention and which may be variously modified according to the characteristics of the animals or fowls to be entrapped.

The floor of the entrance passage or corridor is represented by a tilting platform 14 fulcrumed for example as at 15, and sustained in a substantially balanced condition so as readily to be depressed by comparatively light weight such as that of an animal entering through the entrance door and treading thereon.

The entrance door 12 is mounted for vertical sliding movement in suitable side guides 19 in contact with anti-friction guide rollers 20 serving to minimize friction in movement, and meshing with racks 21 on the exterior surface of the door are the teeth 22 of the balance wheels 23 having a spindle 24 and provided with a counter-balance weight 25. The platform is provided with outwardly extending arms 26 connected by links or pitmen 27 with the balance wheel so that when a weight is imposed upon the platform as by an animal or fowl entering through the door controlled by the trap door, the balance wheels are turned to cause the downward or closing movement of said door to entrap the animal.

Searching for a means of escape the animal or fowl will then readily pass through the opening at the opposite end of the passage or corridor to be taken care of in any suitable or preferred manner forming no part of the present invention, and as soon as the platform is relieved of the weight of the captive, it is returned to its normal position by the counter-balanced door operating member consisting of the balance wheels and this operation raises or returns the door to its normal position to expose the entrance opening for the reception of another animal or fowl.

In the modified construction illustrated in Figures 4 to 6 inclusive the platform 30 forming the floor of the entrance passage or corridor of the trap is pivotally mounted at 31 and carries the arms 32 supporting a suitable weight 33 which is connected by the cords or cables 34 extending over suitable direction pulleys 35 with the upper edge of the door 36 which is mounted to slide in vertical guides 37 in the frame 38 of the trap in operative relation with the door opening 39.

It will be seen that in both of the forms of trap door herein disclosed, the particular advantage over other devices resides in the fact that the platform by which the position of the door is controlled is so positioned as to be occupied by the captive so long as the latter remains in the entrance passage or corridor, the depression of the platform occurring as soon as the captive enters, and being retained as long as the captive remains in the passage, and the fact that the said platform is balanced so as to be susceptible of movement by a very slight weight applied thereto or imposed thereon, and that as soon as the superimposed weight is removed the entrance door returns to its open position ready for the reception of a succeeding animal, there being no fastening means for said door and nothing to interfere with the freedom of movement thereof both in closing and in opening.

Moreover it should be noted that the means whereby the platform and door are counterbalanced, it being obvious that in both forms of the device the platform and door operate in a common direction upon the counter balancing means, the operation of closing and opening the door is practically noiseless and is accomplished without jar and hence without tendency to cause injury to the animal or fowl entering the trap and without causing or tending to cause such alarm of the animal or fowl as to be likely to cause the animal to injure itself in an effort to escape.

Having thus described the invention, what I claim is:—

1. An automatic trap having an entrance, a lever fulcrumed midway of its ends and substantially at said entrance to extend into the trap at one end and exteriorly of the trap at the other end, a closure for said entrance, means exteriorly of the trap counterbalancing the closure and forming an operating connection therefor with the lever, and said lever adapted to be tilted to close the said closure by the weight of an entrant disposed on the first mentioned end of said lever.

2. An automatic trap having an entrance, a door slidably disposed for substantially vertical movement on the trap at said entrance, a shaft, means to mount said shaft from and in advance of the trap at said entrance, a wheel on said shaft, a driving connection between said wheel and said door, a pitman connected to said wheel, a lever fulcrumed midway of its ends and substantially at said entrance to extend into the trap at one end and exteriorly of the trap at the other end, said pitman being connected to the latter end of said lever, said lever at the other end having a platform disposed within the trap, and counter balancing means to normally maintain said parts in a position with said door elevated and with the lever to be tilted to close said door by weight of an entrant disposed on the said platform.

In testimony whereof I affix my signature in presence of two witnesses.

SIMIE HAMPTON.

Witnesses:
S. F. BAUMAN,
MONROE MILLER.